(12) United States Patent
Beier

(10) Patent No.: US 8,561,558 B2
(45) Date of Patent: Oct. 22, 2013

(54) CLEANING ELEMENT, SOWING HEART AND INDIVIDUAL GRAIN SOWING MACHINE

(75) Inventor: Carsten Beier, Salzkotten (DE)

(73) Assignee: Kverneland ASA, Kvernaland (NO)

(*) Notice: Subject to any disclaimer, the term of this patent is extended or adjusted under 35 U.S.C. 154(b) by 251 days.

(21) Appl. No.: 13/125,151

(22) PCT Filed: Nov. 5, 2009

(86) PCT No.: PCT/EP2009/007916
§ 371 (c)(1),
(2), (4) Date: Apr. 20, 2011

(87) PCT Pub. No.: WO2010/051991
PCT Pub. Date: May 14, 2010

(65) Prior Publication Data
US 2011/0219997 A1 Sep. 15, 2011

(30) Foreign Application Priority Data
Nov. 8, 2008 (DE) .......................... 10 2008 056 526

(51) Int. Cl.
A01C 7/046 (2006.01)
A01C 7/00 (2006.01)
A01C 7/16 (2006.01)
A01B 49/06 (2006.01)

(52) U.S. Cl.
USPC ........................................ 111/185

(58) Field of Classification Search
USPC .................... 111/183, 170–182, 184, 185, 14
See application file for complete search history.

(56) References Cited

U.S. PATENT DOCUMENTS 4,718,574 A   1/1988   Schoenmaekers ............ 221/203

FOREIGN PATENT DOCUMENTS

| EP | 0 195 900 | 10/1986 | ............... A01C 7/04 |
| EP | 0 356 771 | 3/1990 | ............... A01C 7/04 |
| FR | 2 323 308 | 4/1977 | ............... A01C 7/04 |
| WO | WO 00/64234 | 11/2000 | ............... A01C 7/04 |

OTHER PUBLICATIONS

International Search Report for International Application No. PCT/EP2009/007916, Feb. 22, 2010.

*Primary Examiner* — Christopher J Novosad
(74) *Attorney, Agent, or Firm* — Kusner & Jaffe

(57) ABSTRACT

Sowing heart for an individual grain sowing machine including a seed disk which can rotate in one direction of rotation R, wherein the seed disk has sowing holes in a defined arrangement; a receiving region for receiving the seed in the sowing holes and a delivery region for delivery of the seed; and a cleaning element for cleaning of the sowing holes during operation of the sowing heart between the delivery region and the receiving region. For improved cleaning action of the cleaning element for cleaning each hole, per revolution of the seed disk there being at least two separate cleaning phases which can be easily replaced at the same time. Furthermore, the invention relates to an individual grain sowing machine with a plurality of sowing assemblies with one aforementioned sowing heart at a time and a corresponding cleaning element.

17 Claims, 6 Drawing Sheets

CLEANING ELEMENT, SOWING HEART AND INDIVIDUAL GRAIN SOWING MACHINE

FIELD OF THE INVENTION

The invention relates to a sowing heart, a cleaning element and an individual grain sowing machine.

BACKGROUND OF THE INVENTION

Known sowing hearts for pneumatic individual grain sowing assemblies generally consist of two halves, specifically a rear part in which the support of the seed disk and the negative pressure zone are housed, and a front part in which the lower output of the seed container discharges and which itself has a seed storage.

In sowing holes of the seed disk which are adapted to the size of the seed and which are arranged at certain intervals on a circular ring, individual seed grains are received from the seed storage and dropped in a delivery region by interrupting the negative pressure. If the interruption of the negative pressure is not sufficient for dropping, there is a forced stripper at a short distance behind the ideal dropping site.

In order to prepare the seed disk for repeated filling with seed, especially for very small and/or fine seed, the hole in the seed disk is cleaned with overpressure. For this purpose, on the back of the seed disk in the prior art a nozzle is mounted tightly adjoining the seed disk such that the compressed air is blown through each hole in order to remove seed residues from the hole.

On the one hand, the nozzle is subject to wear since it is continually abraded by the rotating seed disk and on the other hand the nozzle is fouled both by impurities in the compressed air and also by abraded matter, seed dressing agents or dirt from the seed disk.

Another disadvantage consists in that the cleaning action of the nozzles from the prior art is unsatisfactory, especially after longer use.

SUMMARY OF THE INVENTION

The object of this invention is therefore to provide a sowing heart with cleaning means with functionally improved cleaning action which can be favorably produced and which can be replaced as easily and flexibly as possible.

This object is achieved with a sowing heart, a cleaning element and an individual grain sowing machine, as defined by the independent claims.

Advantageous developments of the invention are given in the dependent claims. All combinations of at least the two features disclosed in the specification, the claims and/or the figures also fall within the framework of the invention.

The basic idea of the invention is to remove residual seed and/or dirt from the sowing holes of the seed disk of the sowing heart by repeated, especially intermittent cleaning in at least two separated cleaning phases. In other words: cleaning takes place preferably in intervals, for example by several pressure surges which take place briefly in succession on each hole per revolution, therefore by repeated fluid application. It is especially advantageous if there are at least two identical cleaning phases. The cleaning action is surprisingly greatly improved by the above described measure, especially compared to simply longer and/or more intense cleaning.

Within the framework of this invention the term seed subsumes for example fertilizers and seed grains, whether pilled or naked.

In one advantageous embodiment of the invention at least two of the cleaning phases take place without contact, i.e. for example by a pressure surge on the sowing holes of the seed disk applied by means of compressed air. Possible additional mechanical cleaning such as for example by a stripper or by brushes is conceivable within the framework of this invention.

Advantageously the cleaning means comprise fluid means, especially a fluid flow, preferably by pressurization of air, since in this way constant and effective cleaning during rotation of the seed disk can be implemented.

To the extent there are cleaning phases at defined, preferable uniform intervals, the cleaning action is greatly improved, especially when the intervals take place briefly in succession, since the repeated sudden change of pressure delivery to the sowing holes, similar to the principle of a percussion drilling machine, enables especially effective cleaning.

Furthermore, in one preferred embodiment it is provided that the cleaning means comprise an especially single cleaning element which is attached opposite the peripheral circular path U of the sowing holes. The peripheral circular path U advantageously describes a circular ring. Providing a single cleaning means simplifies replacement and moreover minimizes the production costs. The cleaning element adjoins the seed disk, especially spring loaded, and extends over a circular ring sector K of the seed disk. The cleaning element is always pressed with optimum pressure against the seed disk by spring loading. This is especially important after a longer running time of the sowing heart since the cleaning element wears or is abraded by the rotation of the seed disk. Because according to this invention there are several cleaning phases, the pressure on the cleaning element in spite of improved cleaning action can even be reduced relative to the nozzles known in the prior art, reducing wear.

The aforementioned embodiment can be further improved by the cleaning element having a fluid chamber which is formed by the seed disk, side walls and a rear wall which is opposite the seed disk. It can be supplied with a fluid, especially via an opening in the rear wall of the fluid chamber.

Advantageously each hole of the seed disk can be supplied with fluid, especially air, from the fluid chamber per revolution of the seed disk at least twice, especially over the entire surface. As soon as one hole of the seed disk comes into contact with the fluid chamber or brushes the fluid chamber, the hole is suddenly exposed to the pressure prevailing in the fluid chamber with a corresponding pressure difference to the vicinity, therefore at the pressure which is prevailing beforehand in this hole, for example atmospheric pressure, and possible dirt or seed residue are expelled. To the extent possible jammed seed or other dirt has not been adequately expelled from the hole by the first cleaning phase, for example due to a layer of fertilizer surrounding the seed, this fouling is reliably expelled in the second cleaning phase or other cleaning phases. This is provided especially by interval-like pressurization in combination with the shearing action on the side walls of the fluid chamber when the fluid chamber is brushed.

This involves especially interruption sections which are provided on the side walls of the fluid chamber for interrupting the application of fluid and which are formed by the pressurization sections of the fluid chamber.

By the pressurization sections being arranged at a distance B along the peripheral circular path U which essentially corresponds to the distance A for simultaneous pressurization of at least two adjacent sowing holes, on the one hand space-saving accommodation of the cleaning element and on the other pressurization at intervals as short as possible can be accomplished. Advantageously the distance B can be reduced by roughly the diameter D of one hole of the seed disk compared to the distance A.

In one alternative embodiment of the invention it is provided that the cleaning means, especially the fluid chamber, is made to pressurize several peripheral circular paths U, U', the cleaning phases of the sowing holes of the peripheral circular path U being made to run alternately or at the same time with the cleaning phases of the sowing holes of the peripheral circular path U'.

The sowing heart advantageously has one fluid port for connection of the cleaning means, especially of the cleaning element. The fluid can be delivered by means of a pump from a fluid reservoir or pneumatics of the individual grain sowing machine to the fluid port and thus to the fluid chamber. An independent invention is the measure that the fluid port is made elastic, especially as a bellows through which fluid flows and at the same time implements the spring action of the fluid port relative to the seed disk.

BRIEF DESCRIPTION OF THE DRAWINGS

Other advantages, features and details of the invention will become apparent from the following description of preferred exemplary embodiments and using the drawings.

DETAILED DESCRIPTION OF THE INVENTION

In the figures the same components and components with the same function are identified with the same reference numbers.

Figure 1A:
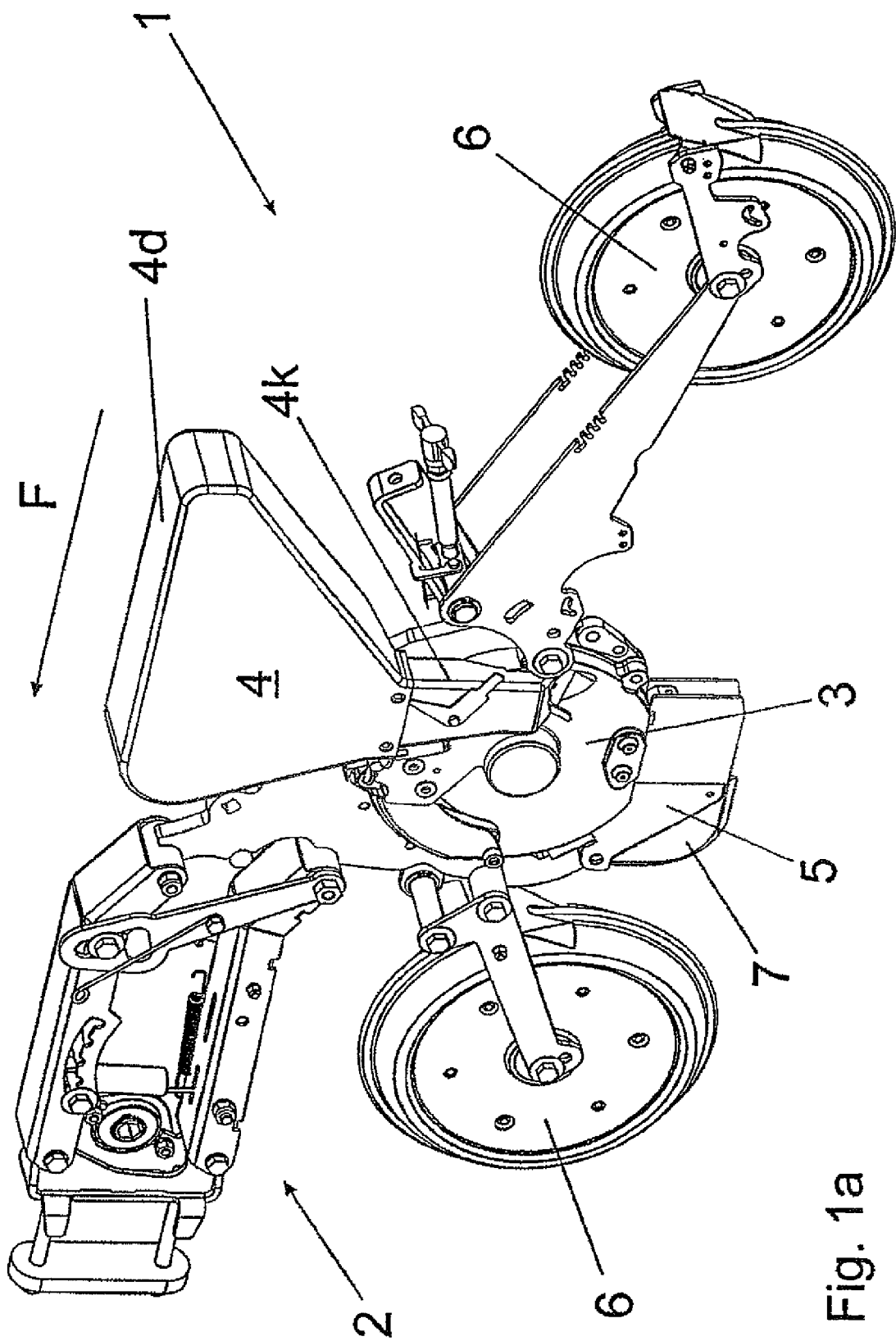
FIGS. 1a and 1b show perspective views of an individual grain sowing assembly of an individual grain sowing machine as claimed in the invention from obliquely behind (FIG. 1a) and from obliquely forward (FIG. 1b)
Figure 1B:
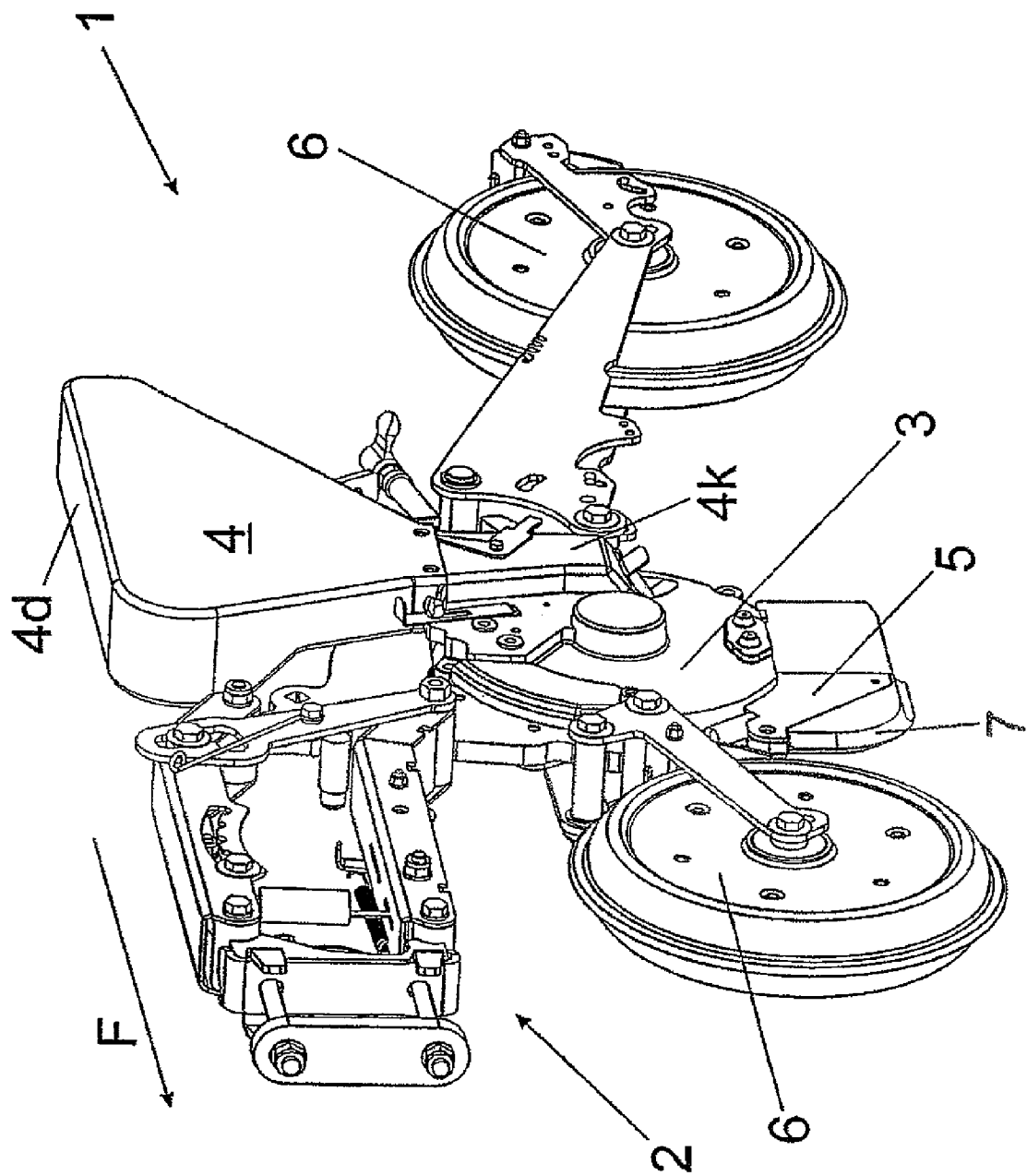

FIGS. 1a and 1b show a sowing assembly 1 of an individual grain sowing machine as claimed in the invention, which is attached to the frame of the individual grain sowing machine via an arm 2. Accordingly the direction of travel in operation of the individual grain sowing machine is in the direction indicated by the arrow F.

The sowing heart 3, a tank 4 located above the sowing heart 3, a sowing coulter 5 located underneath the sowing heart 3 and two wheels 6 which can be pivoted relative to the sowing heart and which are arranged in the direction of travel F in front of and behind the sowing hearts 3 are attached to the arm 2 which allows a pivoting motion, preferably as vertical motion, by making the arm 2 as a parallelogram.

The tank 4 can be closed via a cover 4d and can be filled with seed 16 which is routed in turn laterally into the sowing heart 3 via a channel 4k.

The seed 16 is isolated in the sowing heart 3 and deposited by way of the sowing coulter 5 into a furrow which has been opened by the tip 7 of the sowing coulter 5 in the soil.

Figure 2A:
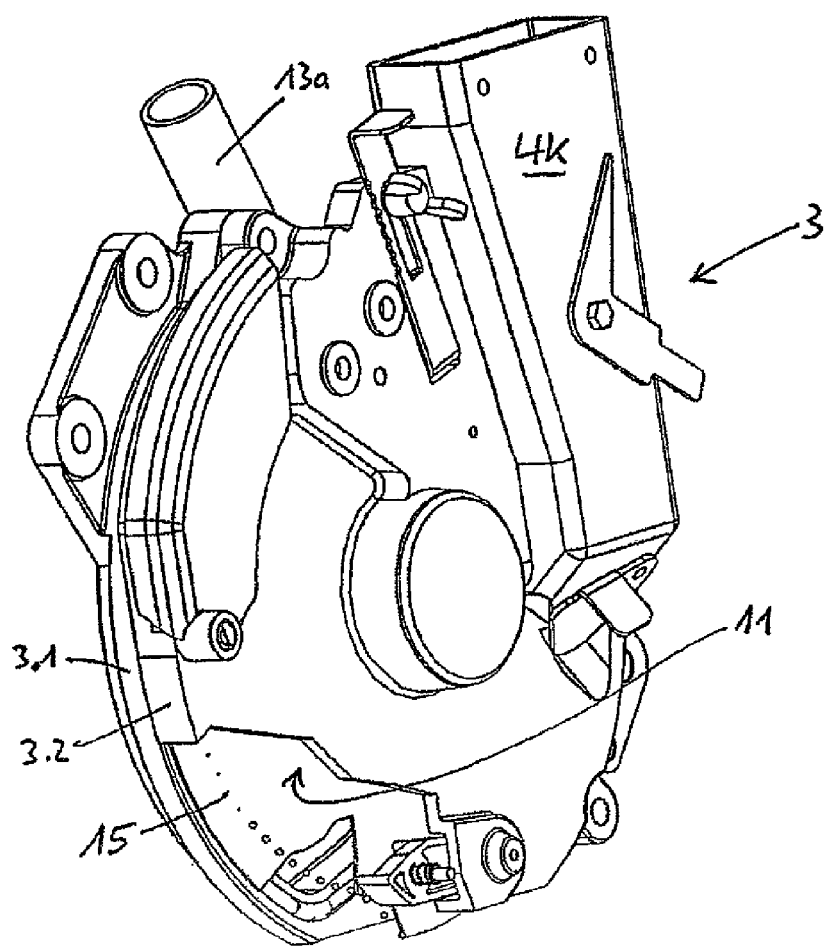
FIG. 2a shows a perspective view of a partially cutaway sowing heart as claimed in the invention.
Figure 2B:
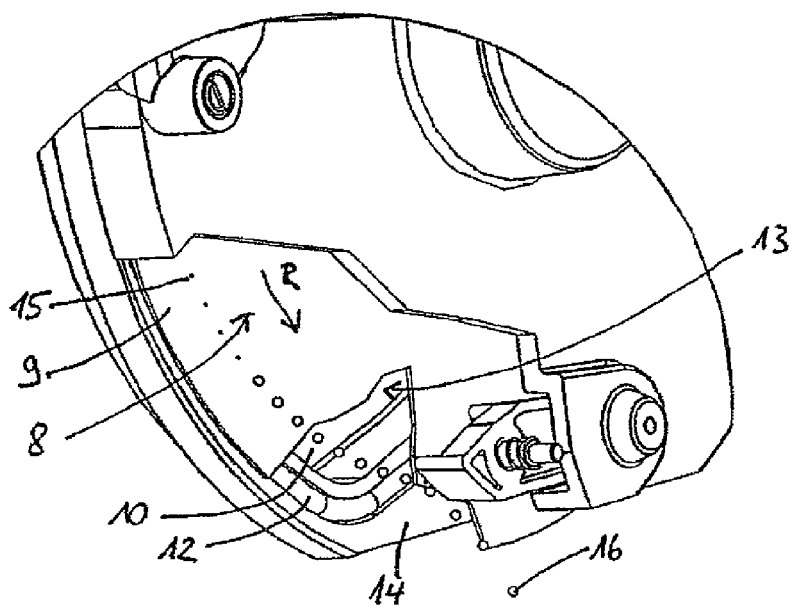
FIG. 2b shows a perspective detail view of the cleaning element from FIG. 2a, FIGS. 3a and 3b show perspective detail views from FIG. 2a relating to different embodiments of the cleaning element as claimed in the invention.

FIG. 2a and FIG. 2b show the sowing heart 3 with its two halves 3.1 and 3.2, a working space 8 which is surrounded by the two halves 3.1 and 3.2 being subdivided by a seed disk 9 into a pressure chamber 10 and a seed chamber 11.

The pressure chamber 10 is divided by a preferably conventional gasket 12 into a negative pressure region 13 and a normal pressure region 14. Here it is important that in the negative pressure region 13 on the sowing holes 15 of the seed disk 9 which are used for receiving and delivering the seed there is a pressure difference which is neutralized in the normal pressure region 14, as a result of which in the transition of the sowing holes 15 from the negative pressure region 13 into the normal pressure region 14 the seed 16 is dropped by the rotary motion of the seed disk 9 in one direction of travel R of the seed disk 9.

The negative pressure region 13 is supplied with negative pressure from a pump which is not shown or a negative pressure fan via the port 13a.

Figure 3A:
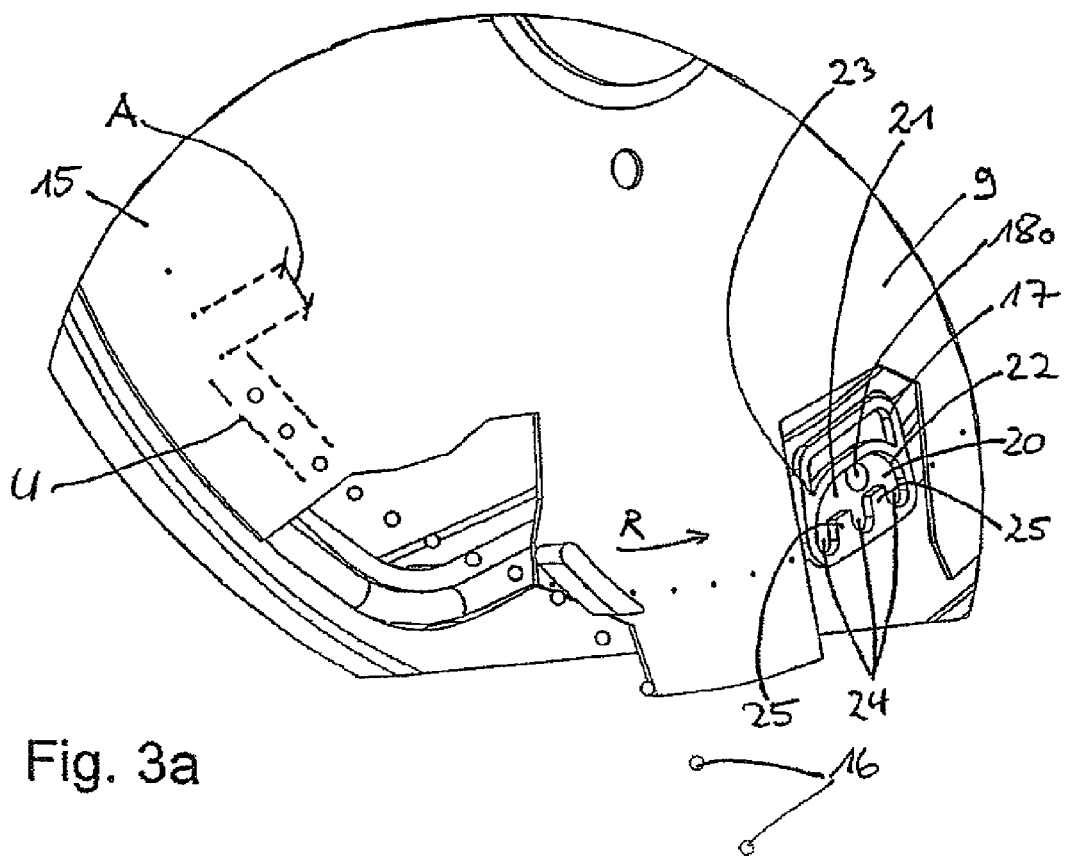
Figure 3B:
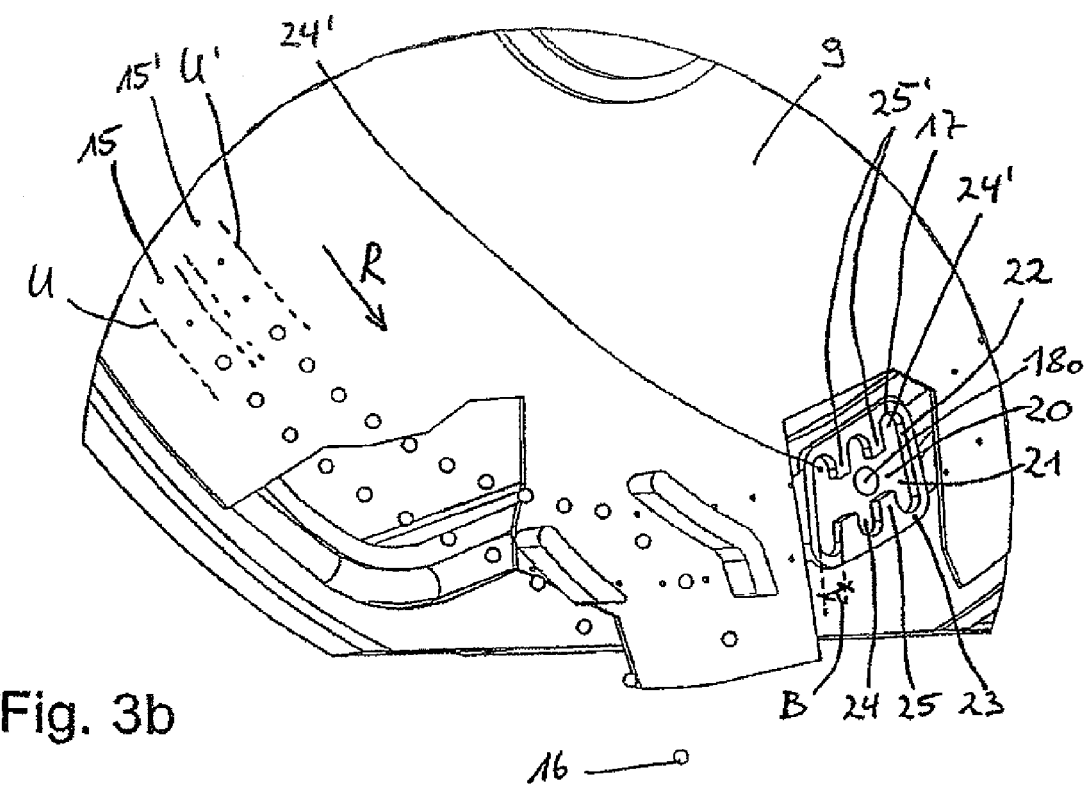

The sowing holes 15 are arranged on a circular path of the seed disk 9 at defined intervals, and there can also be several circular paths with sowing holes 15 (see FIG. 3b).

Figure 4:
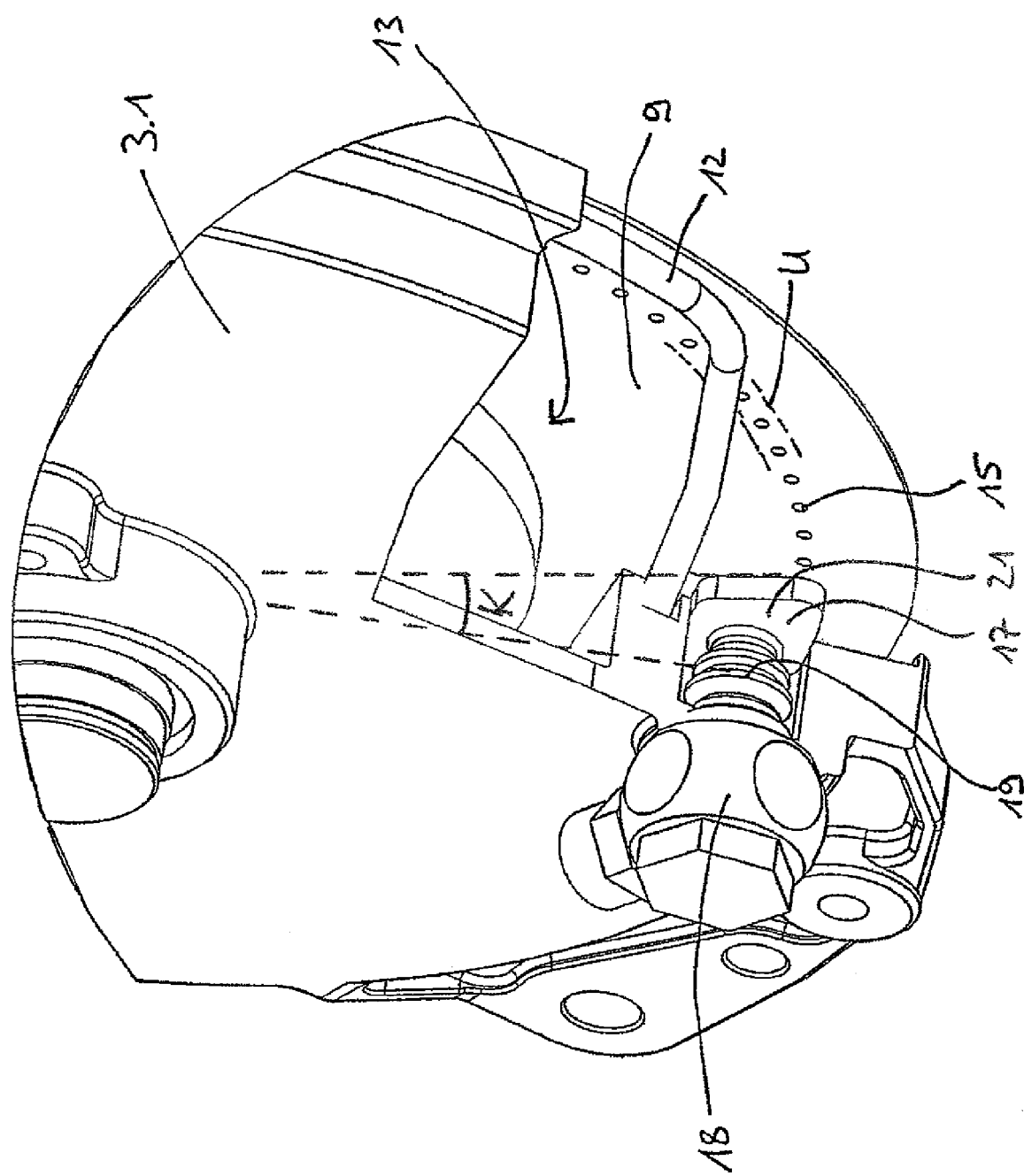
FIG. 4 shows a perspective view of the fluid port as claimed in the invention, made as bellows.

The component which is decisive for this invention, specifically a cleaning element 17, is shown in FIGS. 3a and 3b in two exemplary versions. The cleaning element 17 is connected by a fluid port 18 which is shown in FIG. 4 from the side of the pressure chamber 10 or the half 3.1 of the sowing heart 3 to a fluid pump which is not shown here or pneumatics of the individual grain sowing machine and at the same time is pressed by a bellows 19 of the fluid port 18 against the rotating seed disk 9, in a region which is defined by a peripheral circular path U in which the sowing holes 15 are located, and a circular ring sector K of the sowing disk 9.

The fluid port 18 leads via the bellows 19 and an opening 18o which is shown in FIGS. 3a and 3b into a fluid chamber 20 which is bordered by a rear wall 21 which is pointed toward the fluid port 18, side walls 22 and the seed disk 9. The cleaning element 17 is advantageously made such that on one contact surface 23 between the cleaning element 17 and the seed disk 9 a sealing action is achieved with friction which is as low as possible at the same time between the cleaning element 17 and the seed disk 9. In this connection it is decisive that the material of the seed disk 9 be made less wearing than the material of the cleaning element 17, therefore for example is harder. The material for the cleaning element 17 is brass or hard plastic, especially with a teflon portion.

The cleaning element 17 in the exemplary embodiment as shown in FIG. 3a has three pressurization sections 24 which are formed by two interruption sections 25, both the pressurization sections 24 and also the interruption sections 25 lying on the peripheral circular path U of the sowing holes 15.

The embodiment of the cleaning element 17 as shown in FIG. 3b additionally and opposite to the pressurization sections 24 and interruption sections 25 has corresponding pressurization sections 24' and interruption sections 25' and which lie on another peripheral circular path U' of the sowing holes 15'.

The three adjacent sowing holes 15 are pressurized at the same time in this embodiment since the distance A between two adjacent sowing holes 15 is identical to the distance B between two adjacent pressurization sections 24, 24', in a preferred embodiment is slightly smaller, for example is reduced by the diameter of the sowing holes 15 so that the sowing holes 15 enter the pressurization sections 24, 24' in sequence in direct succession.

The opposite sowing holes 15, 15' can be advantageously arranged offset such that the sowing holes 15' are covered by the interruption sections 25', while the sowing holes 15 are located in the region of the pressurization sections 24.

Extremely effective and at the same time space-saving, repeated pressurization of each individual hole 15, 15' of the seed disk 9 by a single cleaning element is implemented in the preferred embodiment of the invention.

Figure 5A:
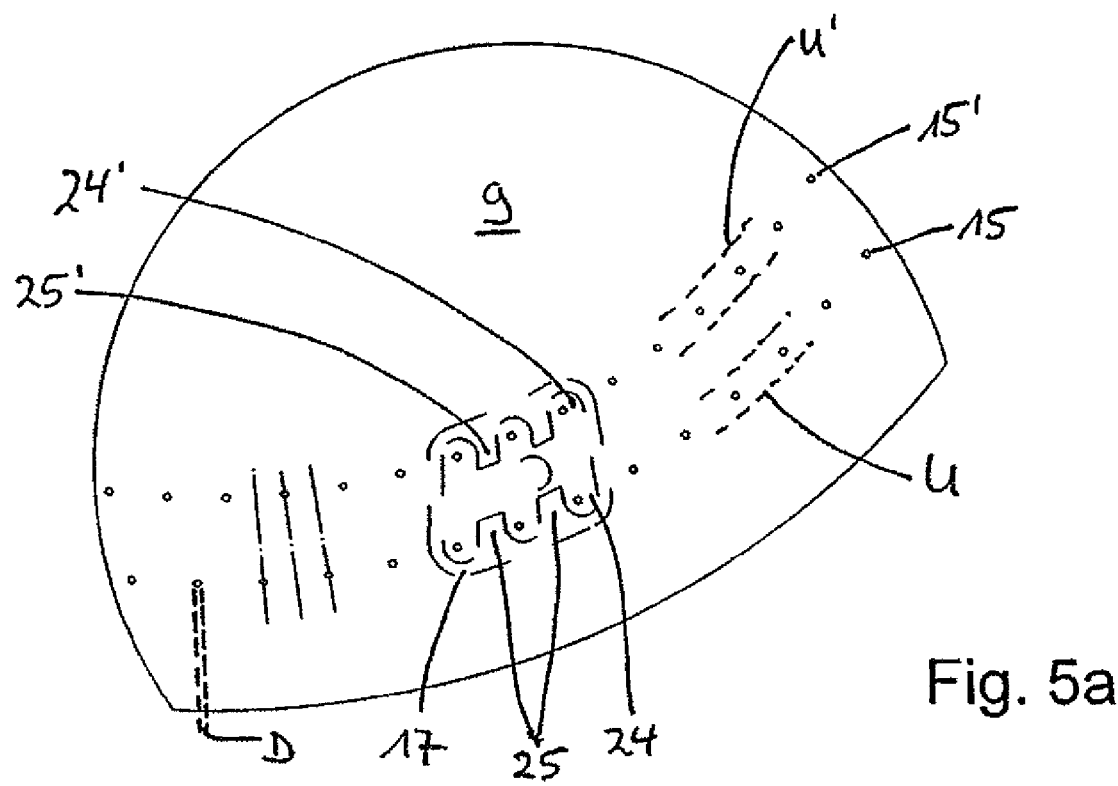
FIGS. 5a and 5b show a schematic of the arrangement of the cleaning element as claimed in the invention relative to the sowing holes of the seed disk.
Figure 5B:
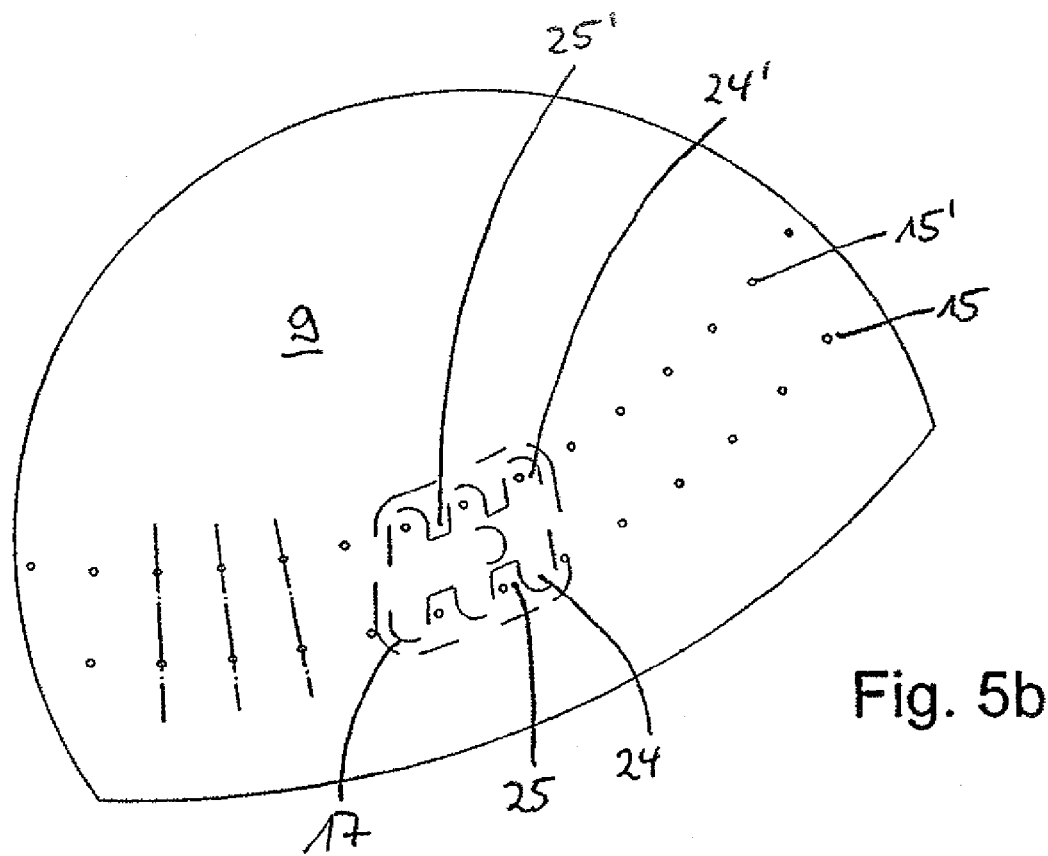

FIGS. 5a and 5b show examples for the arrangement of the pressurization sections 24, 24' and interruption sections 25, 25' relative to the sowing holes 15, 15'.

DESCRIPTION OF THE REFERENCE NUMERALS

A distance
B distance
D diameter
F direction of travel
R direction of rotation of the seed disk
U, U' peripheral circular path
K circular ring sector
1 sowing assembly
2 arm
3 sowing heart
3.1 half
3.2 half
4 tank
4d cover
4k channel
5 sowing coulter
6 wheels
7 coulter point
8 working space
9 seed disk
10 pressure chamber
11 seed chamber
12 gasket
13 negative pressure region
13a port
14 normal pressure region
15, 15' sowing holes
16 seed
17 cleaning element
18 fluid port
18o opening
19 bellows
20 fluid chamber
21 rear wall
22 side walls
23 contact surface
24, 24' pressurization section
25, 25' interruption section Having described the invention, the following is claimed:

1. Sowing heart for an individual grain sowing machine comprising:
   a seed disk rotatable in one direction of rotation R, wherein the seed disk has sowing holes in a defined arrangement;
   a receiving region for receiving seed into the sowing holes and a delivery region for delivery of the seed; and
   cleaning means for cleaning of the sowing holes during operation of the sowing heart between the delivery region and the receiving region,
   wherein said cleaning means cleans each sowing hole in at least two time-separated cleaning phases per revolution of the seed disk, without mechanical contact with the seed disk.

2. Sowing heart as claimed in claim 1, wherein the cleaning means comprise fluid means for providing a flow of a fluid that is directed to the sowing holes.

3. Sowing heart as claimed in claim 2, wherein said fluid is pressurized air.

4. Sowing heart as claimed in claim 1, wherein said at least two cleaning phases take place during rotation of the seed disk.

5. Sowing heart as claimed in claim 1, wherein said at least two cleaning phases occur at defined intervals.

6. Sowing heart as claimed in claim 1, wherein the cleaning means comprise a cleaning element attached opposite a peripheral circular path U of the sowing holes, the cleaning element adjoining the seed disk and extending over a circular ring sector K of the seed disk.

7. Sowing heart as claimed in claim 6, wherein the cleaning element has a fluid chamber formed by the seed disk, side walls and a rear wall opposite the seed disk, said fluid chamber supplied with a fluid via an opening in the rear wall.

8. Sowing heart as claimed in claim 7, wherein each sowing hole is supplied at least twice with the fluid from the fluid chamber per revolution of the seed disk.

9. Sowing heart as claimed in one of claim 7, wherein the fluid chamber has interruption sections forming pressurization sections for interrupting supply of the fluid.

10. Sowing heart as claimed in claim 9, wherein the pressurization sections are arranged at a distance B along the peripheral circular path U essentially corresponding to the distance A for simultaneous pressurization of at least two adjacent sowing holes.

11. Sowing heart as claimed in claim 7, wherein the cleaning means pressurizes peripheral circular paths U, U', wherein the cleaning phases of the sowing holes of the peripheral circular paths U, U' occur alternately or at the same time with the cleaning phases of the sowing holes of another peripheral circular path U' located parallel to the peripheral circular path U.

12. Sowing heart as claimed in claim 7, wherein said fluid supplied to said fluid chamber is air.

13. Sowing heart as claimed in claim 6, wherein the sowing heart has a fluid port for connection of the cleaning means, wherein a fluid is conveyed by means of a pump from a fluid reservoir or pneumatics of the individual grain sowing machine to the fluid port.

14. Sowing heart as claimed in claim 13, wherein the fluid port is made elastic by a bellows.

15. Sowing heart as claimed in claim 6, wherein said cleaning element is spring-loaded.

16. Cleaning element for connection with a sowing heart that includes a seed disk having sowing holes in a defined arrangement and being rotatable in one direction of rotation R, and a receiving region for receiving seed into the sowing holes and a delivery region for delivery of the seed,
   said cleaning element cleans the sowing holes during operation of the sowing heart between the delivery region and the receiving region,
   wherein said cleaning element cleans each sowing hole in at least two time-separated cleaning phases per revolution of the seed disk, without mechanical contact with the seed disk.

17. Individual grain sowing machine having at least one cleaning element connected to a sowing heart that includes a seed disk having sowing holes in a defined arrangement and being rotatable in one direction of rotation R, and a receiving region for receiving seed into the sowing holes and a delivery region for delivery of the seed, said cleaning element cleans the sowing holes during operation of the sowing heart between the delivery region and the receiving region,
wherein said cleaning element cleans each sowing hole in at least two time-separated cleaning phases per revolution of the seed disk, without mechanical contact with the seed disk.

* * * * *